US006133551A

United States Patent [19]

Morrison

[11] Patent Number: 6,133,551

[45] Date of Patent: Oct. 17, 2000

[54] KILN

[76] Inventor: John W. Morrison, Rte. 3, Box 3537B, Athens, Tex. 75751

[21] Appl. No.: 09/038,916

[22] Filed: Mar. 12, 1998

[51] Int. Cl.[7] .......... A21B 1/00

[52] U.S. Cl. .......... 219/408; 432/123; 432/142

[58] Field of Search .......... 219/408, 424, 219/427, 429, 432, 392; 373/20; 392/348, 349, 350; 110/349; 432/52, 11, 142, 123; 75/484

[56] References Cited

U.S. PATENT DOCUMENTS

| | | | |
|---|---|---|---|
| 313,698 | 3/1885 | Weaver | 432/142 |
| 1,280,889 | 10/1918 | Spang | 432/123 |
| 2,622,861 | 12/1952 | Talley | 432/52 |
| 3,443,931 | 5/1969 | Beggs et al. | 75/484 |
| 4,020,322 | 4/1977 | Muse | 219/392 |
| 4,412,813 | 11/1983 | Wulf | 432/11 |
| 4,622,006 | 11/1986 | Hohne | 432/11 |
| 4,622,905 | 11/1986 | MacDougall et al. | 110/347 |

*Primary Examiner*—Teresa Walberg
*Assistant Examiner*—Quang Van
*Attorney, Agent, or Firm*—Morgan L. Crow P.E.

[57] ABSTRACT

A gas or electrically heated kiln furnace in which the hearth is stationary and an outer shell or wall with a door for access rotates around a stationary hearth. Loading and unloading is accomplished by rotating the outer shell to align the door with a position where a workpiece is to be inserted or removed. The kiln can be used as an up draft or down draft kiln, as a single chamber or a progressive chamber kiln. This kiln uses minimum floor space in that a circular shell is not rolled back but rotated about a hearth, around a vertical axis.

11 Claims, 2 Drawing Sheets

KILN

THE FIELD OF THE INVENTION

The invention relates to a kiln having a fixed hearth with an outer shell with a door to rotate to allow easy access to any part of kiln, without removing the shell or outer wall. The invention relates to a kiln or furnace for the purposes of heating, baking and/or treating objects in a continuous, sequential, or batch type process. An example of this process is the firing of ceramics, or the baking of pastries. Some types of kilns being used today are:

The Shuttle Kiln wherein the car or hearth is rolled in and out of the shell.

The Envelope kiln wherein the hearth is stationary and the shell is rolled back and forth over and then away from the hearth and workpieces.

The Bell kiln wherein the hearth is stationary and the shell is raised vertically away from the workpieces.

The Tunnel Kiln wherein the shell is fixed and the cars roll through the shell or wherein the cars roll around within the shell.

The Top loading kiln where the top or lid of shell is removed and replaced.

The shuttle, envelope and tunnel kiln require about twice the floor space as the present invention.

The bell kiln requires overhead room. The bell is lifted to expose the hearth, so that loading and unloading is done beneath the elevated walls. Most of the heated atmosphere is lost in the change of ware.

With the top loading kiln, all kiln furniture must be removed and replaced layer at a time while the operator must bend over and reach down into the kiln. There are limits of kiln depth depending on the operator's reach.

THE RELATED PRIOR ART IN U.S. PATENTS

In U.S. Pat. No. 3,395,904 Hisayoshi, et. al., discloses a rotary furnace having a rotatable chamber including the housing and hearth rotate and wherein the pieces to be heated are inserted and removed from a fixed station. The pieces being treated are rotated on the hearth along with the furnace body. Each one of a multiplicity of doors are sequentially aligned with a single fixed station where the pieces are inserted and removed.

In U.S. Pat. No. 3,805,529 Gornal discloses a fixed furnace body with a rotatable hearth. The pieces to be heated are inserted and removed from a plurality of fixed stations. The pieces being treated are rotated on the hearth within the fixed furnace body.

In U.S. Pat. No. 313,698 Weaver discloses a fixed furnace body with a rotatable hearth. The pieces to be heated are inserted and removed from a single fixed station. The pieces being treated are rotated on the hearth within the fixed furnace body.

In U.S. Pat. No. 4,412,813 Wulf discloses a fixed furnace body with a rotatable hearth. The pieces to be heated are inserted and removed from a single fixed station. The pieces being treated are rotated on the hearth within the fixed furnace body. Wulf also teaches a method of indexing the workpieces around a circle to insert and remove the workpieces in non-adjacent stations.

SUMMARY OF THE INVENTION

The kiln in accordance with this invention comprising a stationary refractory hearth, a bearing rotatable about a substantially vertical axis associated with the hearth, a refractory shell having a generally cylindrical wall and supported on the bearing, and the shell having a door, whereby the shell is rotatable about the vertical axis on the bearing to position the door at various positions about the vertical axis.

The hearth of this kiln, and preferably, the heat source are stationary. The refractory shell is mounted on a bearing and is rotatable about a vertical axis to position the door at any position about the hearth to allow the operator to reach to the center of a kiln, and therefore any position in a kiln, that is about twice the diameter of the operator's arm reach.

DESCRIPTION OF THE PREFERRED EMBODIMENT

Figure 1:
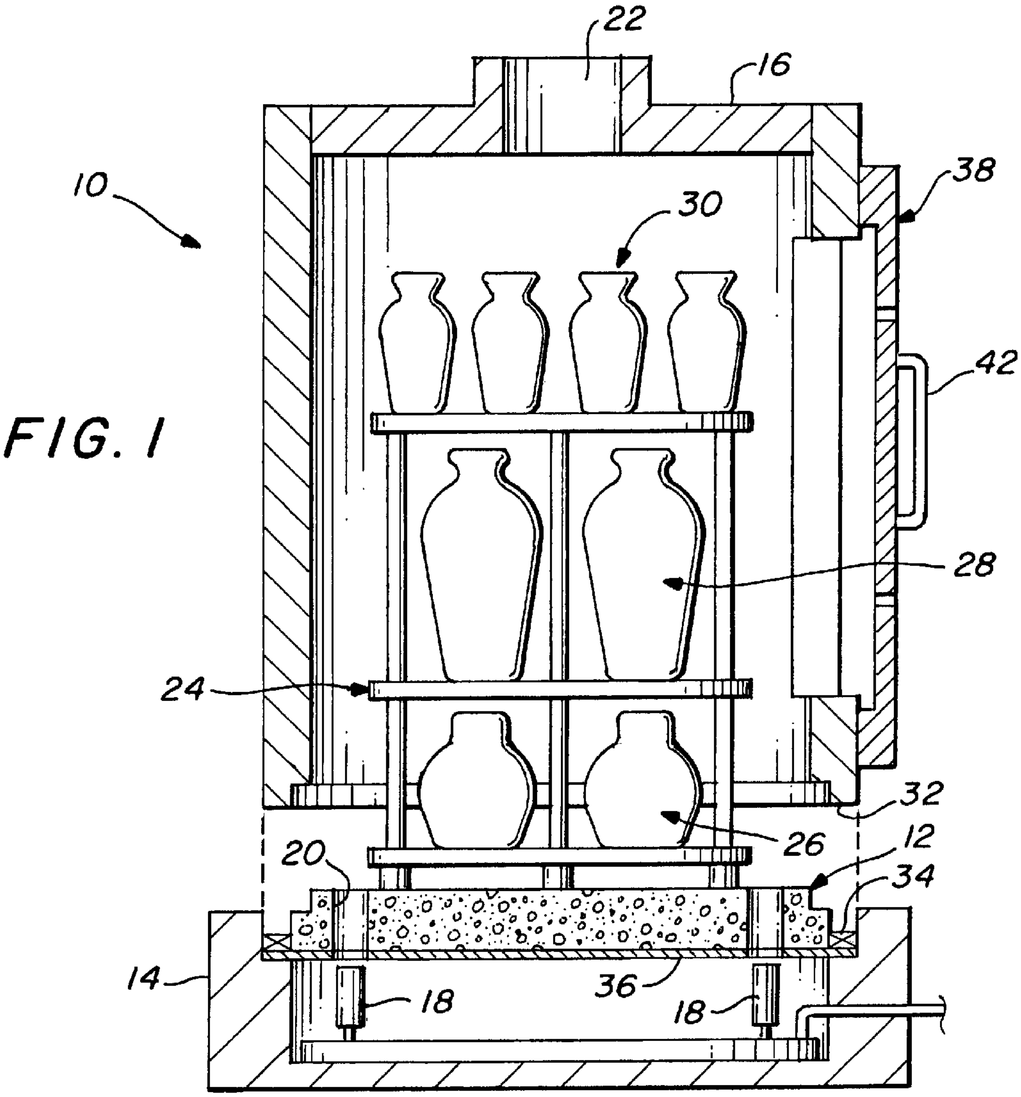
FIG. 1 is a cross-sectional view taken vertically through an updraft, single chamber, gas fired, turret kiln according to the present invention

Referring to FIGS. 1, there is a cross section of the preferred embodiment kiln shown generally at 10. A hearth 12 is supported on a base 14. A shell 16 encloses the work volume of the kiln 10. Burners 18 provide heat for the kiln 10. Holes 20 allow entry of the flames and heat into the kiln. A vent 22 allows escape of the spent gasses from the burners. Fixtures known as furniture 24 support the ware 26, 28 and 30. The furniture 24 is of various configurations to support the ware to be treated, depending on the sizes of the kiln 10 and the pieces of ware 26, 28 or 30. The shell 16 has a bottom surface 32 which is supported by a bearing such as a ball bearing 34 which runs in a groove 36.

Figure 2:
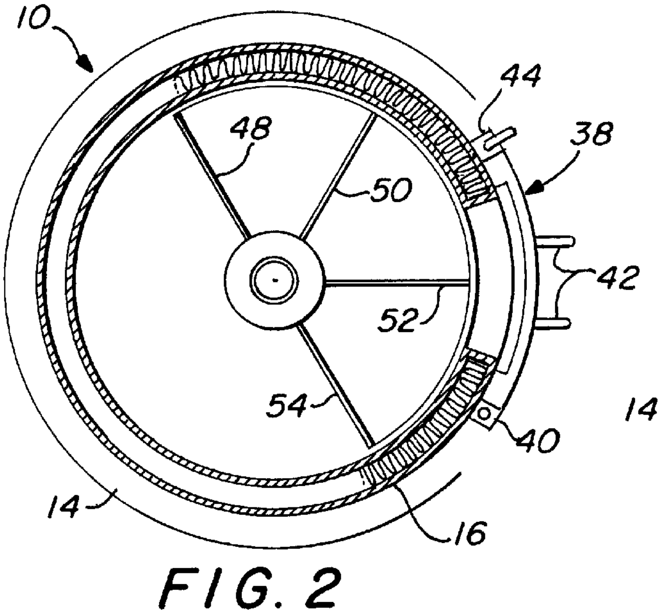
FIG. 2 is a top view of FIG. 1.
Figure 3:
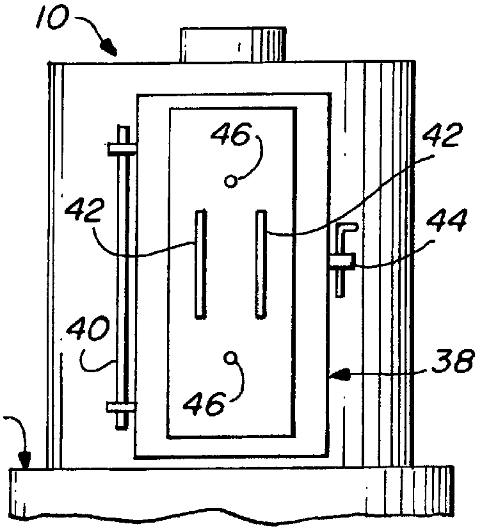
FIG. 3 is a front view of FIG. 1.

Referring to FIGS. 2 and 3 in addition, a door 38 is mounted on the shell 16 with a suitable hinge 40. Handles 42 are used to control the door 38 which is held closed by a suitable latch 44. Access holes 46 allow viewing the ware being heated and also allow the insertion of temperature sensors to monitor the process. The access holes may, in the alternative, be located in the shell wall.

Referring to FIG. 2, refractory walls 48, 50, 52 and 54 are shown.

OPERATION OF THE PREFERRED EMBODIMENT

The turret kiln 10 according to the present embodiment comprises a shell with a door large enough to allow access from top to bottom of kiln and wide enough to put in and remove ware, material to be fired. This embodiment is referred to as an updraft kiln because of the upward movement of the gasses through the heated volume of the kiln.

Ware is loaded into the kiln 10 through the door 38. The shell 16 is rotated as items of ware 26, 28 and 30 are placed inside until the kiln is loaded as desired. The door 38 is closed and the kiln is brought up to a temperature determined to be satisfactory. The firing process can be monitored by rotating the shell and visual inspection or monitoring by instruments inserted through the access holes 46 in the door to make sure the kiln is firing evenly.

When the desired temperature is reached, the kiln 10 is shut off and allowed to cool. The door 38 is then opened and the fired pieces of ware are removed. New pieces to be fired are placed inside the kiln and the shell is rotated to a new position. This process is repeated until the kiln is fully unloaded and reloaded, then the firing process is repeated.

If the kiln is used as a progressive chamber kiln in that it is divided into compartments by refractory walls 48, 50, 52 and 54. the door is rotated to a first compartment between walls 48 and 50 and the compartment is loaded. A second compartment between walls 50 and 52 is loaded while the first compartment is being fired. This progression is followed allowing each chamber to be utilized continuously. The number of chambers depends on specific uses and requirements, i.e., a material that fires and cools quickly would require two (2) chambers, while a slow cooling material might require three (3) or more chambers.

The Turret kiln can be changed between batch and progressive modes by adding, moving or removing the inside walls. These walls cam be placed on and supported by the hearth 12.

The shell 16 is easily rotated on bearings outside the hearth 12. If repair or modification is required, the kiln shell 16 can be lifted to clear the hearth 12 and the load. Then the shell can be replaced by reversing the process.

Therefore, a kiln may comprise stationary refractory hearth means, bearing means rotatable about a substantially vertical axis and associated with the hearth means, refractory shell means having a generally cylindrical wall, and enclosed with roof means, and supported on the bearing means, heating means for heating above the hearth means and inside the shell means, and the shell means having door means, whereby the shell means is rotatable about the vertical axis on the bearing means to selectively position the door means at various positions about the vertical axis. A kiln according to the invention may further comprising stationary vertical divider means disposed about the vertical axis to form at least two compartments above the hearth means and inside the shell means whereby the compartments are selectively accessible through the door means in the shell means by selectively rotating the shell means to position the door means adjacent any one of the compartments. A kiln according to the invention may further comprise refractory access hole means in the shell means. A kiln according to the invention may further comprise refractory access hole means in the door means. A kiln according to the invention may further comprise the heating means being flame heating means positioned near the hearth means and inside the shell means, and vent means through the roof means of the shell means for escape of heat and gasses from the flame heating means, whereby heat and gasses from the flame heating means flow generally upwardly in the shell means to the vent means. A kiln according to the invention may further comprise the stationary refractory hearth means having a generally circular shape with an outer periphery, the heating means being flame heating means positioned near the periphery of the hearth means and inside the shell means, and vent pipe means having an entry end and an exit end and extending through the roof means of the shell means for escape of heat and gasses from the flame heating means, to position the entry end of the vent pipe means closer the roof means than the hearth means, whereby heat and gasses from the flame heating means flow generally upwardly in the shell means to the vent means to enter the entry end of the vent pipe means.

DESCRIPTION OF THE ALTERNATE EMBODIMENTS

Figure 4:
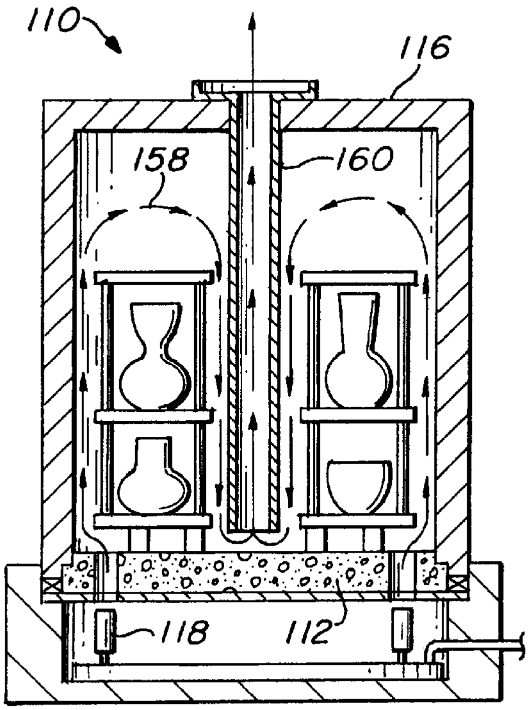
FIG. 4 is a cross section of an alternate embodiment.

Referring to FIG. 4, there is illustrated a downdraft adaptation of the preferred embodiment that is the same in operation as the preferred embodiment except that a flue pipe 160 has been installed in the vent opening in the top of the shell 116. This embodiment has a door in the rotary shell 116 like the preferred embodiment. Burners 118 around the periphery of the hearth 112 sends heated gasses into the heated volume of the kiln 110. The heated gasses follow the flow path of the arrows 158 up into the kiln, then down to enter the bottom end of the flue pipe 160. The bottom end of the flue pipe is desirably closer to the hearth at the bottom of the kiln than to the roof of the kiln. Then, a kiln in which the vent pipe means extends through the roof means far enough that the entry end of the vent pipe means is closer to the hearth means than to the roof means, causes heat and gasses that have flowed upwardly into the shell means to then flow downwardly to the entry end of the vent pipe means. The advantage of this embodiment is that the preferred embodiment of this invention as an updraft kiln can be converted to a downdraft kiln by the installation of the flue pipe 160.

Figure 5:
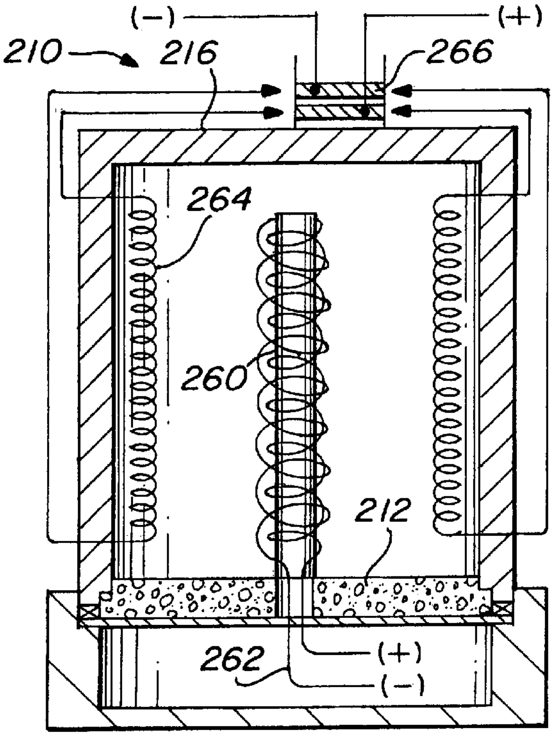
FIG. 5 is a cross section of still another alternate embodiment.

Referring to FIG. 5, there is illustrated still other embodiments of the invention. Other aspects of the operation of this kiln is similar to the preferred embodiment, except that these embodiments are electrically heated. This embodiment has a door in the rotary shell 216 like the preferred embodiment. The kiln 210 can be utilized as an electric kiln by the installation of one or more electrically heated elements in a column 260. Since the hearth 212 is stationary, and the column 260 are stationary, the electric power cable 262 for the electric heaters in the column 260 is stationary, the connection is very simple.

An additional embodiment shown in FIG. 5 is the electric heating elements 264 mounted on the inside wall of the shell 216. This embodiment has a door in the rotary shell 216 like the preferred embodiment. Since the shell 216 is rotated to load and unload the different volumes in the kiln 210, a rotary electrical connection 266 provides power to the heating elements 264.

FIG. 5 therefore illustrates three embodiments of the invention:

1. A kiln with electric heating elements only in a column 260.
2. A kiln with electric heating elements 264 only in the shell 216.
3. A kiln with electric heating elements in a column 260 and electric heating elements 264 disposed internally to and adjacent the shell wall.

Figure 6:
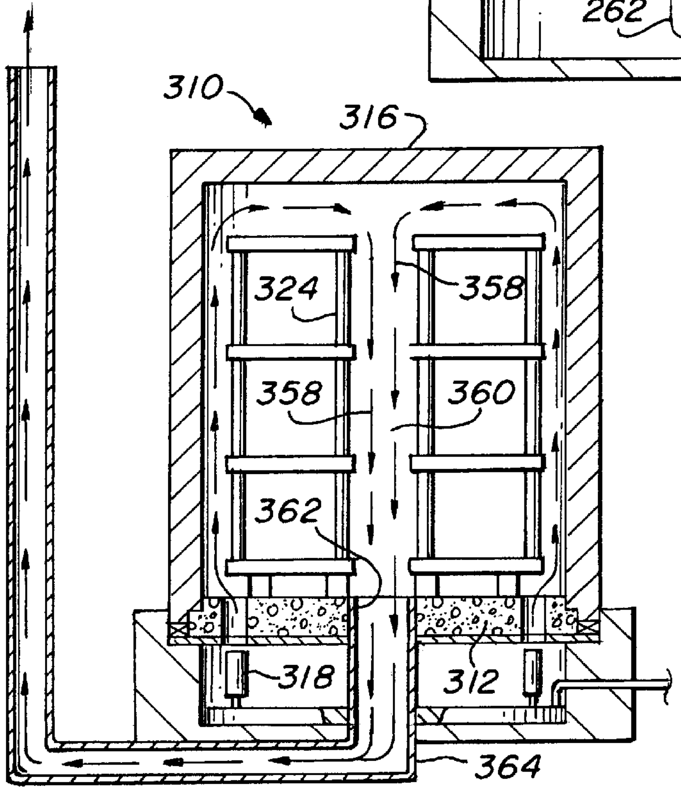
FIG. 6 is a cross section of still another alternate embodiment.

FIG. 6 illustrates another downdraft kiln 310. This embodiment has a door in the rotary shell 316 like the preferred embodiment. There is illustrated a downdraft adaptation of the preferred embodiment that is the same in operation as the preferred embodiment except that a passageway 362 has been provided in the vent opening in the center of the hearth 312. A passageway 360 has been provided in the center of the kiln 310. The passageway 360 can be defined with the furniture 324, or, alternately, with a flue pipe (not shown) supported on the center of the hearth and communicating with the passageway 362 in the hearth. This embodiment has a door in the rotary shell 316 like the preferred embodiment. Burners 318 around the periphery of the hearth 312 sends heated gasses into the heated volume of the kiln 310. The heated gasses follow the flow path of the arrows 358 up into the kiln, then down the center of the heated volume of the kiln 310 to exit the bottom of the kiln 310 through a vent 362 in the center of the hearth 312. A vent pipe 364 conducts the spent gasses away from the kiln 310.

A kiln according to this invention may further comprise the heating means being electric heating means disposed generally about the vertical axis. A kiln according to this invention may further comprise the heating means being electric heating means disposed generally adjacent the hearth. A kiln according to this invention may comprise a stationary refractory hearth, a bearing rotatable about a substantially vertical axis associated with the hearth, a refractory shell having a generally cylindrical wall and supported on the bearing, heating means for heating above the hearth and inside the shell means, and the shell having a door, whereby the shell is rotatable about the vertical axis on the bearing to position the door at various positions about the vertical axis.

A kiln according to this invention may further comprise a stationary vertical divider disposed about the vertical axis to form at least two compartments above the hearth and inside the shell whereby the compartments are selectively accessible through the door in the shell by selectively rotating the shell to position the door adjacent any one of the compartments. A kiln according to this invention may further comprise a refractory access hole in the shell. A kiln according to this invention may further comprise a refractory access hole in the door. A kiln according to this invention may further comprise the heating means being flame heating means positioned near the hearth and inside the shell, and a vent through the roof of the shell for escape of heat and gasses from the flame heating means, whereby heat and gasses from the flame heating means flow generally upwardly in the shell to the vent. A kiln according to this invention may further comprise the stationary refractory hearth having a generally circular shape with an outer periphery, the heating means being flame heating means positioned near the periphery of the hearth and inside the shell, and a vent pipe connected to the vent and having an entry end and an exit end connected to the vent for escape of heat and gasses from the flame heating means, whereby heat and gasses from the flame heating means flow generally upwardly in the shell means to the vent means to enter the entry end of the vent pipe means. A kiln according to this invention may further comprise the heating means being electric heating means disposed generally about the vertical axis. A kiln according to this invention may further comprise the heating means being electric heating means disposed generally adjacent the hearth.

OPERATION OF THE ALTERNATE EMBODIMENTS

Referring to the alternate embodiments illustrated in FIG. 4, the flue pipe 160 can be installed in the preferred embodiment to achieve a downdraft kiln operation. Once this conversion is made, the operation of the kiln is the same as the preferred embodiment.

Referring to the alternate embodiments illustrated in FIG. 5, the adaptation of this invention to electric heat is shown. This design allows for large electric kilns to be built. With the present invention, the operator only has to reach near to the center of the heated volume. Since the operator can rotate the shell 216, the operator can reach the space in a kiln about twice the diameter of a fixed shell and fixed hearth kiln, the useable volume of the kiln is about four times as large. A circle of twice the diameter has four times the area as the smaller circle. So the workable volume of a kiln is about four times as large as a kiln half the diameter. The rotating shell positions the door to access all space in the kiln. Since the shell does not have to be lifted for access, there is less restriction on height required for operation of the kiln.

Referring to FIG. 6, there is illustrated a downdraft embodiment of the kiln. The operation of this embodiment is the same as the preferred embodiment. A kiln according to this embodiment may further comprise the stationary refractory hearth having a generally circular shape with a central portion and an outer periphery, the heating means being flame heating means positioned near the periphery of the hearth and inside the shell, and a vent pipe having an entry end and an exit end, the entry end positioned near and communicating with the central portion of the hearth, with a portion of the vent pipe positioned below the hearth and extending beyond the outer periphery of the hearth, to provide for escape of heat and gasses from the flame heating means, whereby heat and gasses from the flame heating means flow generally upwardly in the shell means, then flow downwardly to the central portion of the hearth to enter the vent pipe entry and flow to the vent pipe exit end for discharge. The advantage of this embodiment is that the heating means and vent means are all stationary, eliminating moving connections to the heating means, hearth and vent.

In the absence of a gas, oil or electricity, solid fuel can be used by building a fire box below the hearth and allowing heat to come through the port in hearth and out the top. The door can be rotated so as to be up-wind from the smoke or fumes.

The temperature of the kiln is regulated by the amount of heat placed in the kiln and the opening and closing of the flue vent or vents. The kiln is monitored by rotating the door around while looking through the access hole located in it.

For purposes of this specification, kiln, oven and furnace are interchangeable words and have the same meaning. For purposes of this specification, ware and workpieces are interchangeable words and have the same meaning.

Even though several embodiments of the invention have been illustrated in the accompanying drawings and described in the foregoing Description it will be understood that the invention is not limited to the embodiments disclosed, but is capable of rearrangements, modifications, and substitutions and reversals of parts and elements without departing from the spirit of the invention.

I claim:

1. A kiln comprising:

stationary refractory hearth means, bearing means rotatable about a substantially vertical axis and associated with the hearth means, refractory shell means having a generally cylindrical wall, and enclosed with roof means, and supported on the bearing means, heating means for heating above the hearth means and inside the shell means, the shell means having door means, whereby the shell means is rotatable about the vertical axis on the bearing means to selectively position the door means at various positions about the vertical axis, and stationary vertical divider means disposed about the vertical axis to form at least two compartments above the hearth means and inside the shell means whereby the compartments are selectively accessible through the door means in the shell means by selectively rotating the shell means to position the door means adjacent any one of the compartments.

2. A kiln according to claim 1 further comprising refractory access hole means in the shell means.

3. A kiln according to claim 1 further comprising refractory access hole means in the door means.

4. A kiln according to claim 1 further comprising:

the heating means being electric heating means disposed generally about the vertical axis.

5. A kiln according to claim 1 further comprising:

the heating means being electric heating means disposed generally adjacent the hearth means.

6. A kiln comprising:

a stationary refractory hearth, a bearing rotatable about a substantially vertical axis associated with the hearth, a refractory shell having a generally cylindrical wall and supported on the bearing, heating means for heating above the hearth and inside the shell means, and the shell having a door, whereby the shell is rotatable about the vertical axis on the bearing to position the door at various positions about the vertical axis, and a stationary vertical divider disposed about the vertical axis to form at least two compartments above the hearth and inside the shell whereby the compartments are selectively accessible through the door in the shell by selectively rotating the shell to position the door adjacent any one of the compartments.

7. A kiln according to claim 6 further comprising a refractory access hole in the shell.

8. A kiln according to claim 6 further comprising a refractory access hole in the door.

9. A kiln according to claim 6 further comprising:

the heating means being electric heating means disposed generally about the vertical axis.

10. A kiln according to claim 6 further comprising:

the heating means being electric heating means disposed generally adjacent the hearth.

11. A kiln according to claim 6 wherein said electric heating means are disposed internally to and adjacent the cylindrical wall.

* * * * *